United States Patent [19]

Khandkar

[11] Patent Number: 5,171,645
[45] Date of Patent: Dec. 15, 1992

[54] ZIRCONIA-BISMUTH OXIDE GRADED ELECTROLYTE

[75] Inventor: Ashok C. Khandkar, Salt Lake City, Utah

[73] Assignee: Gas Research Institute, Inc., Chicago, Ill.

[21] Appl. No.: 638,617

[22] Filed: Jan. 8, 1991

[51] Int. Cl.$^5$ .................. C04B 35/48; C04B 35/50
[52] U.S. Cl. ............................. 429/33; 429/30;
429/193; 501/103; 501/104; 501/126; 501/152;
427/79; 427/115; 428/699; 428/701; 204/421
[58] Field of Search .................. 429/33, 193, 30;
501/104, 103, 126, 152; 427/79, 115; 204/427,
421; 428/699, 701

[56] References Cited

U.S. PATENT DOCUMENTS 4,459,340  7/1984  Mason .................... 429/33
5,006,494  4/1991  Virkar .................... 429/193

FOREIGN PATENT DOCUMENTS 011398  11/1987  Japan.

Primary Examiner—William R. Dixon, Jr.
Assistant Examiner—C. Melissa Bonner
Attorney, Agent, or Firm—Trask, Britt & Rossa

[57] ABSTRACT

A graded electrolyte of zirconia and bismuth oxide containing proposed surface regions one of which is rich in zirconia, the other rich in bismuth oxide is disclosed. The strength and reduction resistance of zirconia is combined with the high ionic conductivity of bismuth oxide to form a superior oxygen ion-conducting electrolyte which is especially useful in fuel cells.

20 Claims, 7 Drawing Sheets

| | ELECTRODE |
|---|---|
| L2 | $Bi_2O_3$ RICH LAYER WITH DOPANTS |
| L4 | $Bi_2O_3$ + $ZrO_2$ (MINOR) WITH DOPANTS |
| L3 | $ZrO_2$ + $Bi_2O_3$ (MINOR) WITH DOPANTS |
| L1 | $ZrO_2$ RICH LAYER WITH DOPANTS |
| | ELECTRODE |

PLANAR CONFIGURATION
SOLID OXIDE FUEL CELL

FIG. 1

| | |
|---|---|
| | ELECTRODE |
| L2 | $Bi_2O_3$ RICH LAYER WITH DOPANTS |
| L4 | $Bi_2O_3$ + $ZrO_2$ (MINOR) WITH DOPANTS |
| L3 | $ZrO_2$ + $Bi_2O_3$ (MINOR) WITH DOPANTS |
| L1 | $ZrO_2$ RICH LAYER WITH DOPANTS |
| | ELECTRODE |

*Fig. 2*

CTE PROPERTIES AND COMPOSITIONS OF 4-LAYER ELECTROLYTES

| LAYER | COMPOSITION | CTE (x 10 E6/C) | SAMPLE CODE |
|---|---|---|---|
| 1 ($ZrO_2$ RICH) | 95% $ZrO_2$ + 5% $Bi_{0.75}Y_{0.25}$ | 10.4 | 4L-1 |
| 2 | 80% $ZrO_2$ + 20% $Bi_{0.75}Y_{0.25}$ | 10.4 | |
| 3 | 40% $ZrO_2$ + 60% $Bi_{0.75}Y_{0.25}$ | 11.7 | |
| 4 ($Bi_2O_3$ RICH) | 100% $Bi_{0.75}Y_{0.25}$ | 15.5 | |
| 1 ($ZrO_2$ RICH) | 85% $ZrO_2$ + 15% $Bi_{0.75}Y_{0.25}$ | 10.9* | 4L-2 |
| 2 | 31% $ZrO_2$ + 69% $Bi_{0.75}Y_{0.25}$ | 14.1* | |
| 3 | 7% $ZrO_2$ + 93% $Bi_{0.75}Y_{0.25}$ | 15.5 | |
| 4 ($Bi_2O_3$ RICH) | 100% $Bi_{0.75}Y_{0.25}$ | 15.5 | |
| 1 ($ZrO_2$ RICH) | 95% $ZrO_2$ + 5% $Bi_{0.6}Y_{0.4}$ | 10.7 | 4L-3 |
| 2 | 80% $ZrO_2$ + 20% $Bi_{0.6}Y_{0.4}$ | 10.9* | |
| 3 | 40% $ZrO_2$ + 60% $Bi_{0.6}Y_{0.4}$ | 13.1 | |
| 4 ($Bi_2O_3$ RICH) | 100% $Bi_{0.6}Y_{0.4}$ | 15.5 | |

LAYER 1    |    LAYER 2
ZrO₂

Fig. 5

SCHEMATIC OF A CONDUCTIVITY RIG

ZIRCONIA-BISMUTH OXIDE GRADED ELECTROLYTE

BACKGROUND OF THE INVENTION

This invention relates to oxygen ion conducting electrolytes and particularly to zirconia/hafnia electrolytes used in solid oxide fuel cells.

STATE OF THE ART

Solid oxide fuel cells (SOFCs) are well known in the art with many different structures having been employed. However, SOFCs, regardless of structure and materials of construction, employ a solid electrolyte which conducts oxygen ions, is generally unaffected by oxidizing or reducing conditions and can withstand temperatures of at least 600° C.

Typical fuel cells are described in the following U.S. Patents: U.S. Pat. Nos. 4,476,196 by Poeppel et al.; 4,476,197 by Herceg; 4,510,213 by Schnacke; 4,476,198 by Ackerman et al.; 4,510,212 by Fraioli; and 4,599,282 by Hirota et al., the contents of which are hereby incorporated by reference.

Although fuel cell structures and materials may vary, a fuel cell is basically a galvanic energy conversion device that chemically combines hydrogen or a hydrocarbon fuel and an oxidant within catalytic confines to produce a DC electrical output. In one form of fuel cell, cathode material defines the passageways for the oxidant, and anode material defines the passageways for the fuel, and an electrolyte separates the cathode and anode materials. The fuel and oxidant, typically as gases, are then continuously passed through the cell passageways separated from one another, and unused fuel and oxidant discharged from the fuel cell generally also remove the reaction products and heat generated in the cell. Being infeeds, the fuel and oxidant are typically not considered an integral part of the fuel cell itself.

The hydrogen reaction on the anode (the negative electrode with oxide ions generates water with the release of electrons, and the oxygen reaction on the cathode with the electrons, effectively forms the oxide ions. Electrons flow from the anode through the appropriate external load to the cathode, and the circuit is closed internally by the transport of oxide ions through the electrolyte. The electrolyte insulates the cathode and anode from one another with respect to electron flow but permits oxygen ions to flow from the cathode to the anode. Thus, the reactions are as follows:

$$\text{cathode } \tfrac{1}{2}O_2 + 2e \rightarrow O^{2-} \tag{1}$$

$$\text{anode } H_2 + O^{2-} \rightarrow H_2O + 2e \tag{2}$$

The overall cell reaction is:

$$H_2 + \tfrac{1}{2}O_2 \rightarrow H_2O \tag{3}$$

In addition to hydrogen, the fuel can be derived from a hydrocarbon such as methane ($CH_4$) reformed by exposure to steam at 350° C. or above, which initially produces carbon monoxide (CO), and three molecules of hydrogen. As hydrogen is consumed, the shift reaction occurs as follows:

$$CO + H_2O \rightarrow CO_2 + H_2 \tag{4}$$

The overall reaction of hydrocarbons in the cell is illustrated by $$CH_4 + 2O_2 \rightarrow CO_2 + 2H_2O \tag{5}$$

Inasmuch as the conversion is electrochemical, the thermal limitations of the Carnot cycle are circumvented; therefore, efficiencies in the range exceeding 50% fuel energy conversion to electrical output can be theoretically obtained. This is much higher than equivalent thermal engines utilizing the same fuel conversion, including even a conventional diesel powered engine.

The electrolyte isolates the fuel and oxidant gases from one another while providing a medium allowing the ionic transfer and voltage buildup between the electrodes. The electrodes (cathode and anode) provide paths for the internal flow of electrical current within the fuel cell to the cell terminals which also connect then with an external load. The operating voltage across each cell is of the order of 0.7 volts maximum so the individual cells are placed in electrical series to obtain a convenient load voltage. A series connection is accomplished between adjacent cells with an interconnect material which isolates the fuel and oxidant gases from one another while yet electronically connecting the anode of one cell to the cathode of an adjoining cell.

Inasmuch as the active electrochemical generation of electricity takes place only across the electrolyte portions of the fuel cell, any interconnect separation between the cathode and anode, in order to provide the series electrical connection between the cells, renders that part of the fuel cell electrically nonproductive. The percentage of interconnect to electrolyte wall area defining each cell, if high, could significantly reduce the energy or power densities of such a fuel cell.

Diffusion of the reacting molecular species (fuel or oxidant) through the electrodes to the electrolyte also limits the cell performance. Fuel and oxidant must diffuse away from the flow in the respective passageways through the electrolyte to the reaction sites. The fuel and oxidant diffuse through the electrodes to the electrolyte and react at (or near) the three-phase boundary of the gases, the electrodes (anode or cathode) and electrolyte, where electrochemical conversion occurs. As the hydrogen partial pressure of the fuel gases decreases along the length of the fuel passageways, less voltage is generated near or at the downstream end of the fuel passageways.

While it is possible thermally and electrically to extract great quantities of energy from the fuel, it is also inherently inefficient to extract such energies to the complete depletion of the fuel and oxidant. Complete conversion of the fuel in the fuel cell is thus not sought as it is intrinsically inefficient in the overall output of the cell voltage. For both a single cell and cells in gas flow series, the maximum theoretical voltage decreases along the cell. Practical fuel cells therefore consume only 80 to 90% of the fuel because the cell voltage decreases rapidly as the hydrogen becomes less than 5% of the fuel gas. The reduction in maximum cell voltage as the fuel is consumed is an important limitation.

One proposed type of solid oxide fuel cell utilizes a ceramic support tube, and the electrodes (anode and cathode) and electrolyte are built up as layers on the support tube. The support tube is confined in a sealed housing, the fuel and oxidant are manifolded to the housing, and the reaction products are ported from the housing as required. Depending on the layer build-up, the fuel is either conveyed internally of the support tube and the oxidant is conveyed externally of the support tube or vice versa. A practical fuel cell unit would be composed of many such tubes supported within an exterior housing, and manifolding would separate and direct the fuel and oxidant proximate the tubes.

A typical support tube might be formed of calcium stabilized zirconia ($ZrO_2 + CaO$); the cathode typically would be applied to the exterior face of the support tube and might be in the form of lanthanum manganite ($LaMnO_3$); the electrolyte would be layered over a portion of the cathode, comprised, for example, of yttria-stabilized zirconia ($ZrO + Y_2O_3$); and the anode would be layered over the electrolyte comprised, for example, of a cobalt yttria-stabilized zirconia cermet or mixture ($Co + ZrO_2 + Y_2O_3$). The oxidant would thereby flow internally of the structural tube while fuel will be circulated externally of the tube. For part of the cell where a series connection was to be made with an adjacent cell, the interconnection would be layered over the cathode at this location instead of the electrolyte and anode to engage the anode of the adjacent cell. The interconnect might be comprised, for example, of lanthanum chromite ($LaCrO_3$).

Electrolytes used in solid oxide fuel cells must withstand very high temperatures, that is, temperatures from about 700° C. to about 1100° C. as well as being an excellent oxygen ion conductor. The less resistant the electrolyte is to oxygen ion conductivity, then the more rapidly the oxygen ions are transported and the more efficient is the generation of electrical energy. Thus, the electrolyte has a significant impact upon the efficiency of the fuel cell. Electrolytes typically used in fuel cells are zirconia based inasmuch as zirconia has generally been preferred for its strength as well as for having good oxygen ion conductivity. Bismuth oxide, in contrast, has not been utilized in fuel cells even though it has oxygen ion conductivity which is many fold that of zirconia under similar conditions. Bismuth oxide, however, is not readily stable in the presence of a reducing atmosphere and, once reduced, loses its integrity and conductivity. Thus, bismuth oxide has not been used to any significant extent in fuel cells.

SUMMARY OF THE INVENTION

A graded metal oxide electrolyte comprising gradations of zirconia and bismuth oxide across the cross-section of electrolyte has now been invented. A graded electrolyte having one surface layer rich in zirconia, that is, at least about 95% zirconia, and an opposed surface layer which is rich in bismuth oxide, that is, having at least 85% bismuth oxide with intermediate layers or zones of various zirconia-bismuth oxide contents has now been invented. The bismuth oxide present in the graded electrolyte of the instant invention is present in combination with yttria (the molar ratio of bismuth oxide to yttria is about 3 to 2, plus or minus about 10%). The presence of a small amount of bismuth oxide in a zirconia-rich layer acts as a sintering aid.

DETAILED DESCRIPTION OF INVENTION

A unique electrolyte for solid oxide fuel cells (SOFCs) has been invented. The unique electrolyte which has one surface layer rich in zirconia and an opposed surface layer rich in a bismuth oxide-yttrium oxide (yttria) composition enables an SOFC to be operated efficiently at a temperature range of about 600° C. to about 700° C. in contrast to about 1000° C. to 1100° C. for a fuel cell having a monolithic zirconia electrolyte. Lower temperature operation is advantageous from the standpoint of seal life, thermal stresses and the like.

The unique electrolyte of the instant invention generally comprises at least three different compositional zones and preferably four or five compositional zones wherein the first outer layer is rich in zirconia preferably containing about at least 95% zirconia and from about 3% to about 5% of a bismuth oxide-yttria oxide composition wherein the molar ratio of bismuth oxide to yttria is about 3:2 plus or minus about 10% and preferably plus or minus about 5%. A second electrolyte surface layer is rich in bismuth oxide-yttria composition containing a minimum of about 85% to about 95% of such a bismuth oxide-yttria oxide composition. At least one intermediate layer between the surface zones is present wherein the zirconia content and the bismuth oxide-yttria content are more equally balanced.

A substantial difference exists in the coefficient of thermal expansion between zirconia and a bismuth oxide-yttria composition. A gradation of compositional content across the wall thickness of the electrolyte from a substantially pure zirconia surface zone to a substantially pure bismuth oxide-yttria surface zone minimizes the stress at the interfaces between the various compositional zones. Preferably, about four compositional zones are present and are generally most efficient for the purposes of the invention.

The different compositional zones within the electrolyte are generally of a fuel-side surface zone of zirconia sintered to a high degree of the theoretical density. The zirconia-rich surface zone exposed to fuels must not be pervious or porous inasmuch as the presence of any fuel, for example, hydrogen or a hydrocarbon such as methane, propane, or the like, will tend to reduce any bismuth oxide that it comes in contact with. However, the other zones may be less dense and may be formed wherein a skeletal zirconia layer is filled with bismuth oxide to create a bismuth oxide-rich layer. Skeletal ceramic articles are described in the U.S. patent application of Khandkar, U.S. patent application Ser. No. 346,074, filed May 2, 1989, the text of which is incorporated herein by reference.

A very effective use of this invention resides in making flat or planar electrolytes. These electrolytes may be made by mechanically pressing material in a green state wherein a mold is filled with ceramic powder of preselected compositions to give a graded compositional variation across the thickness of the electrolyte, or the electrolyte may be made from tape cast materials of different compositions which are layered to give the appropriate compositional variation. The tape cast layers may then be pressed together to form the electrolyte in the green state subject to firing at temperatures in the range of about 1100° C. to about 1450° C. to give a sintered article.

Figure 1:
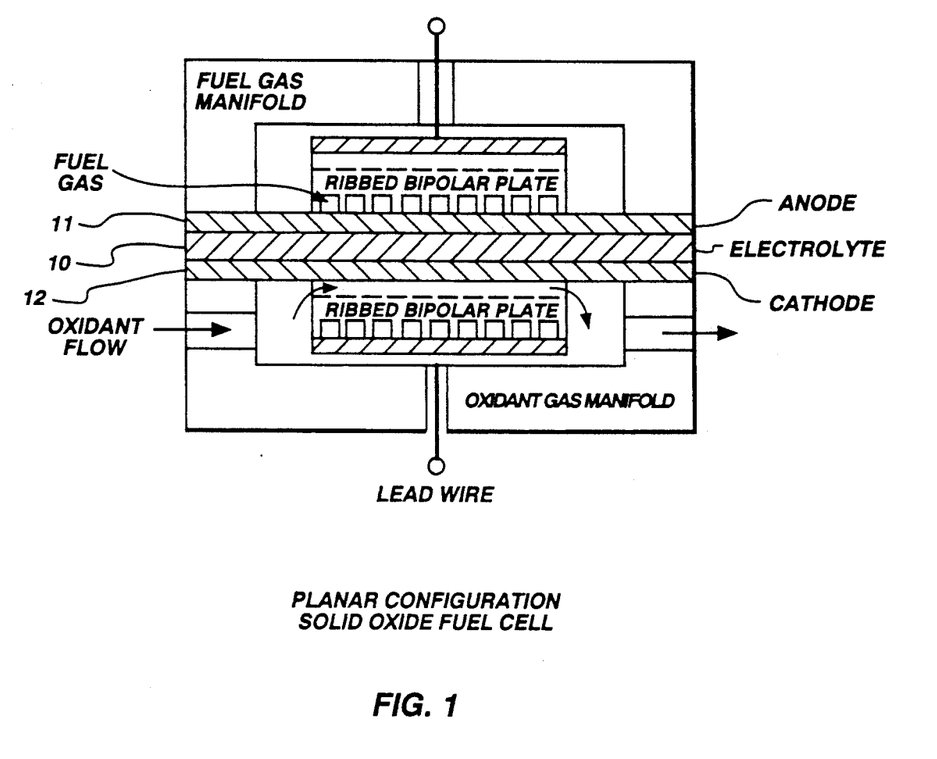
FIG. 1 is a sectional view of a typical solid oxide fuel cell.

A typical solid oxide fuel cell is illustrated in FIG. 1 where item 10 is the electrolyte, item 11 an electrode (anode) and item 12 is an electrode (cathode). A cathode is generally formed of $LaMnO_3$ or $LaCoO_3$ and is exposed to oxygen or air. The anode is composed of $Ni/ZrO_2$ cermet and is exposed to fuel which is typically hydrogen or methane. The cell may be operated in reverse to act as an electrolyzer with a mixture of $H_2$ and water vapor being introduced to the fuel cell and polarity reversed so that a direct current is introduced to create a voltage potential between the two electrodes with the former cathode becoming the anode to cause oxygen ions to migrate from one electrode through the electrolyte to the other electrode. This is done to regenerate fuel in certain instances such as use aboard space vehicles. In space vehicles, solid oxide fuel cells operate not only to produce energy but also to produce potable water. An SOFC employing the electrolytes of the instant invention performs well as an electrolyzer.

Figure 2:
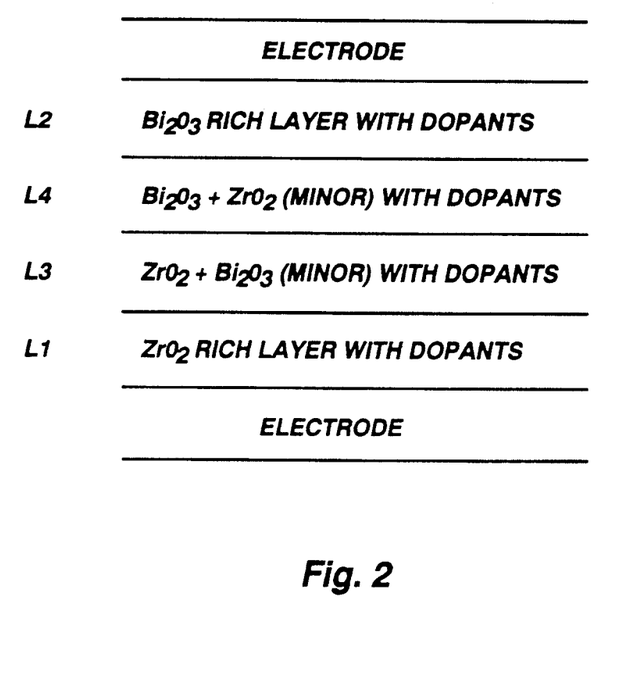
FIG. 2 is a sectional view of a graded electrolyte of the instant invention.

A cross-section of a graded electrolyte in accordance with the instant invention is illustrated in FIG. 2. The electrolyte has a plurality of zones with zone L1 being an outer layer consisting essentially of zirconia with minor amounts of a sintering aid, for example, up to about 5% bismuth oxide. The opposite outer layer or outer zone L2 consists essentially of bismuth oxide and yttria with minor amounts of zirconia, for example, up to about 10% zirconia. Bismuth oxide and yttria are present in preferably a 3 to 2 molar proportion plus or minus 10%, preferably plus or minus 5%.

Layer L3 is situated adjacent to layer L1 and consists essentially of zirconia as the major component and bismuth oxide as a minor component, bismuth oxide being doped with yttria in a molar ratio similar to layer L2. In layer L3, the zirconia is present from about 65% to 80% and preferably at about 70%. Yttria may be present in conjunction with said zirconia in an amount of about 3 to about 10 mol. % of said $ZrO_2 \cdot Y_2O_3$ composition.

L4 is situated between layers L3 and L2 and consists essentially of bismuth oxide as the major component with zirconia as a minor component. Bismuth oxide is combined with yttria in the ratio set forth for layer L2 with the bismuth oxide-yttria combination being present as about 75% to 85% of the layer and preferably as about 80%, with zirconia making up the remainder.

In the graded electrolyte just described, an electrode is present on the surface of each outer layer. A cathode is affixed to the bismuth oxide-rich layer, that is, layer L2 which is exposed to oxygen or air. Preferably, the cathode material is platinum, lanthanum strontium manganate, lanthanum strontium cobaltite, silver and similar nonreactive, electronic conductive materials. The cathode must generally be porous to permit oxygen molecules to pass through the electrode to be present at the electrode/electrolyte interface whereby oxygen dissociates into oxygen ions which are transported across (through) the electrolyte to combine with fuel at the anode region. Silver cathodes need not be made porous inasmuch as silver, at the temperatures of operation of the cell, generally has high permeability to oxygen molecules.

At the anode surface, oxygen combines with fuel such as carbon or hydrogen to form a gaseous reaction product such as carbon monoxide, carbon dioxide and water.

Typical overall thicknesses for graded electrolytes of the instant invention are from about 0.1 to about 0.5 mm. The thickness of individual layers may be from about 0.025 to about 0.1 mm.

The invention may be more fully understood by reference to the following examples:

EXAMPLE 1

Preliminary experiments on fabrication of two- and three-layer composite electrolyte pellets with 8 mol % yttria-stabilized zirconia and bismuth 0.75, yttria 0.25 oxide (molar ratios) compositions indicated that the integrity of the pellets was poor. Composite three-layer pellets fabricated by uniaxial compaction (250 MPa) of 8 mol % yttria-stabilized zirconia (outer layer) and $Bi_{0.75}Y_{0.25}$ oxide containing 5% (outer layer) and 41% zirconia (interior layer) resulted in delamination between the three layers which had been individually pressed and then pressed together to form a single pellet in method A. The composite pellets were sintered together at 1100° C. Using method B, the three powder compositions were uniaxially pressed to a pressure of 70 MPa and sintered to 1100° C. for one hour. It was noticed that while bonding between the three layers improved, there seemed to be some volatility of the bismuth oxide phase as evidenced by the extensive coloration of the furnace setters as well as the "pitted" appearance of the pellets. Sintered pellets exhibited a maximum weight loss for the bismuth-rich compositions of about 1.5%.

In the two- and three-layer composites sintered at 1100° C., there was delamination evident in each of the samples. At a lower sintering temperature of 800° C., there was generally better integrity of the composite structures, however, the zirconia layer at such sintering temperature exhibited about 24% porosity.

This suggests that the primary reason for delamination is due to generation of interfacial thermal stresses due to differences in sinterability of the two phases as well as the thermal expansion coefficient mismatch. Those stresses may be due to differences in densification rates and temperatures between the zirconia-rich phase and the bismuth oxide-rich phases.

EXAMPLE 2

Figure 3:
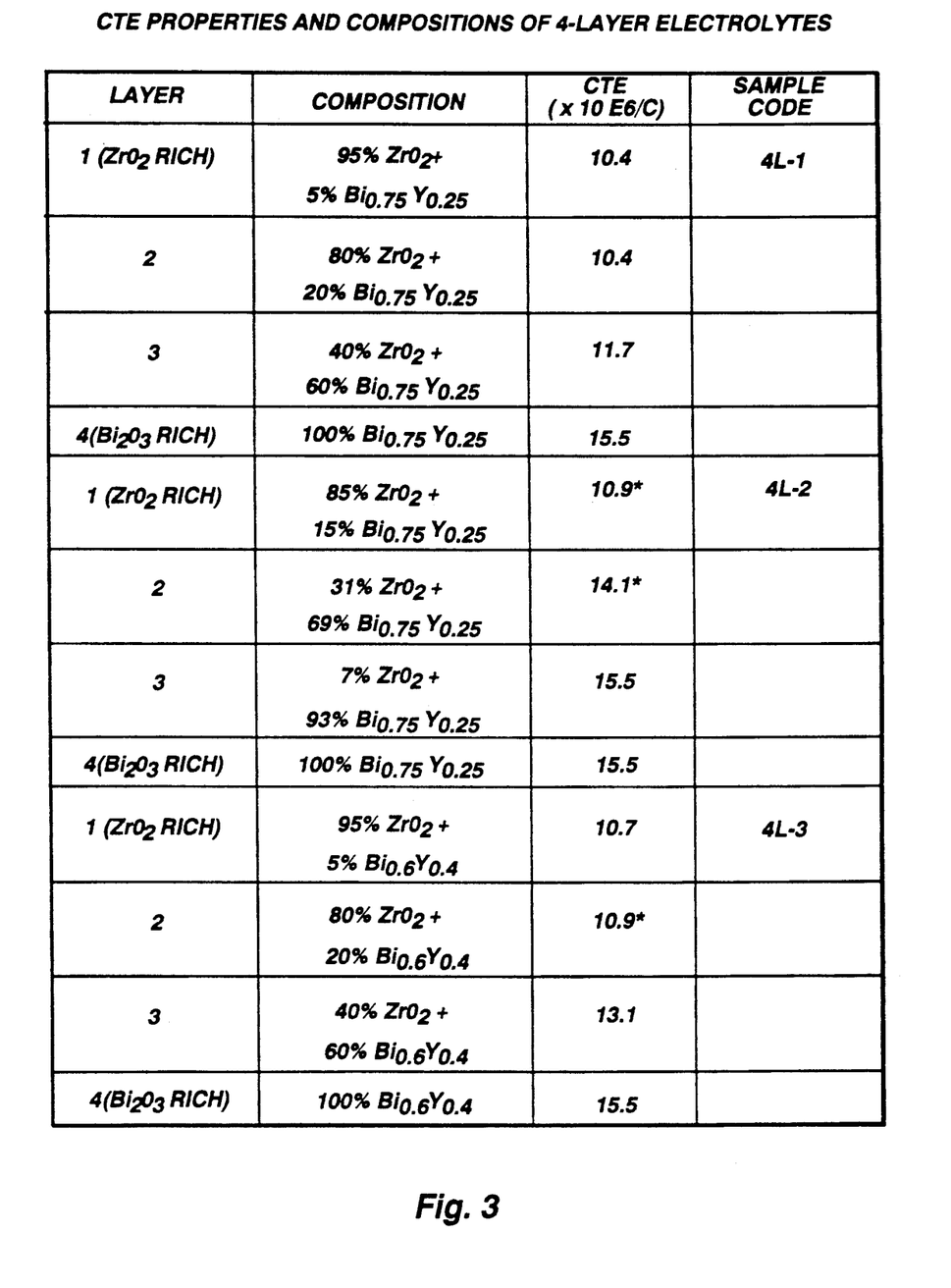
FIG. 3 is a table illustrating various four-layer composites.
Figure 4:
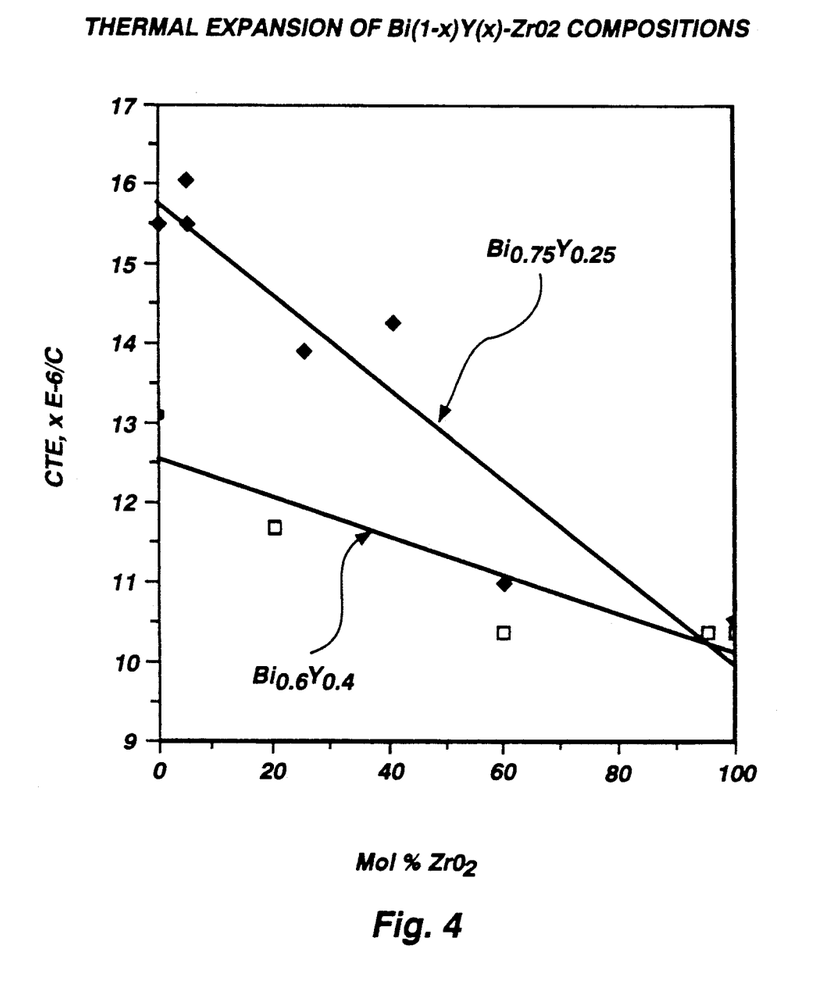
FIG. 4 is a graph comparing the coefficients of thermal expansion of various $Bi_2O_3/Y_2O_3/ZrO_2$ compositions.

To lower the CTE (coefficient of thermal expansion) mismatch, four-layer composite electrolytes with compositions as given and illustrated in the table in FIG. 3 were fabricated. The CTEs of the different oxide compositions are shown in FIG. 4. Stabilized zirconia has a CTE of approximately $11 \times 10^{-6}/°C$. while $Bi_{0.75}Y_{0.25}$ oxide solid solution has a CTE of $15.5 \times 10^{-6}/°C$ and $Bi_{0.6}Y_{0.4}$ has a CTE of $12.5 \times 10^{-6}$. Increasing the zirconia content of a $Bi_2O_3/Y_2O_3$ composition lowers its CTE.

The zirconia-rich compositional layer contained 5 mol % of the bismuth oxide-yttria oxide solid solution. Prior earlier work indicated such a solid solution ($Bi_2O_3 Y_2O_3$) acted as a sintering aid for the zirconia. In the work of Keizer et al., it was demonstrated that it is possible to sinter high zirconia content compositions to densities greater than 95% of theoretical with the predominant phase assemblage comprising high conductivity cubic crystals and minor amounts of the second phase present mainly at the grain boundaries. This latter phase was determined to be predominantly bismuth oxide rich and was presumed to form a liquid phase with good wetting characteristics which promoted diffusion and thus aided sintering.

Comparison of sintered composite pellets between 4L-1, 4L-2, 4L-3 series (see FIG. 3) indicated that the optimal composition is the four-layer composition with $Bi_{0.6}Y_{0.4}$ as the best solid solution. An example of 4L-3 sintered at 800° C. for two hours generally showed no evidence of delamination at the interfaces. However, some problems associated with concavity of the composite as well as incomplete densification of zirconia layer existed.

A sample of the 4L-3 composition was hot pressed as an alternative method for simultaneously achieving optimal density of the zirconia-rich outer layer and good adhesion between the layers with reduced shrinkage stresses. The hot pressing temperature range was from about 850° C. to about 100° C. at a pressure of about 1 to about 10 ksi.

Figure 5:
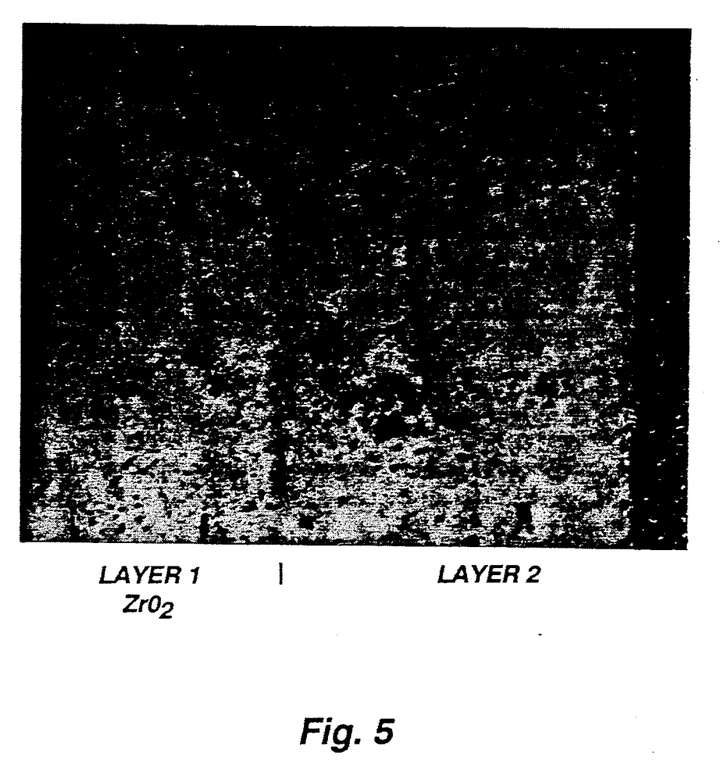
FIG. 5 is a photomicrograph of a cross-section of a hot-pressed, four-layer composite electrolyte.

Several trials were made to optimize the hot pressing parameters using various ramp rates, pressures and soak times as well as die materials. In most cases, the hot pressed samples cracked through the bismuth oxide-rich layers, that is, layers 2, 3 and 4. Finally, hot pressing in air was accomplished successfully on small, approximately 0.5 inch diameter, composite pellets using an alumina die and punch set. FIG. 5 shows the micrographs of such a hot pressed 4L-3 composite electrolyte. This sample was sintered at 1100° C. for one hour. This particular composite pellet exhibited the best interfacial characteristics and the highest density in the zirconia-rich layer.

EXAMPLE 3

The conductivity of four-layer composite electrolytes (sample 4L-3) was determined.

Figure 6:
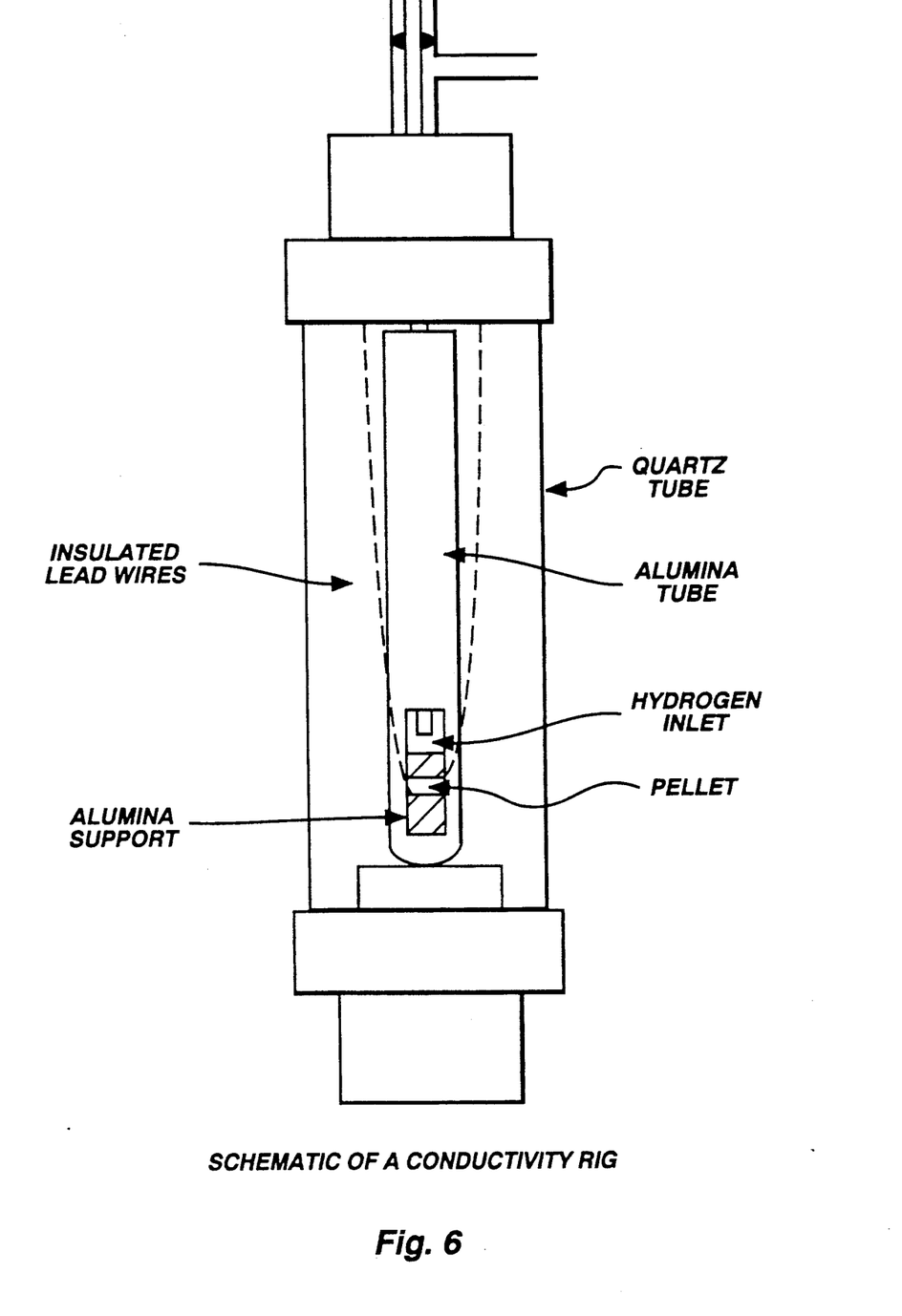
FIG. 6 is a schematic illustration of a conductivity-measuring apparatus used to measure conductivity of composite electrolyte pellets.

A schematic of the experimental setup used to measure conductivity of electrolyte pellets is illustrated in FIG. 6. The apparatus consisted of an alumina tube onto which the composite electrolyte pellets were sandwiched between alumina media to effect good contact with silver leads. Silver metal leads were taken out through vertical slots made on the side of the tube. Silver paste was applied on to the faces of the pellets to maintain good contact and the pellets were sandwiched between silver foil. The entire arrangement was placed inside a quartz tube which was sealed with provisions for controlled gas atmospheres. In some cases, conductivity was determined over four decades of frequency ranging from 5 Hz to 50 KHz.

Figure 7:
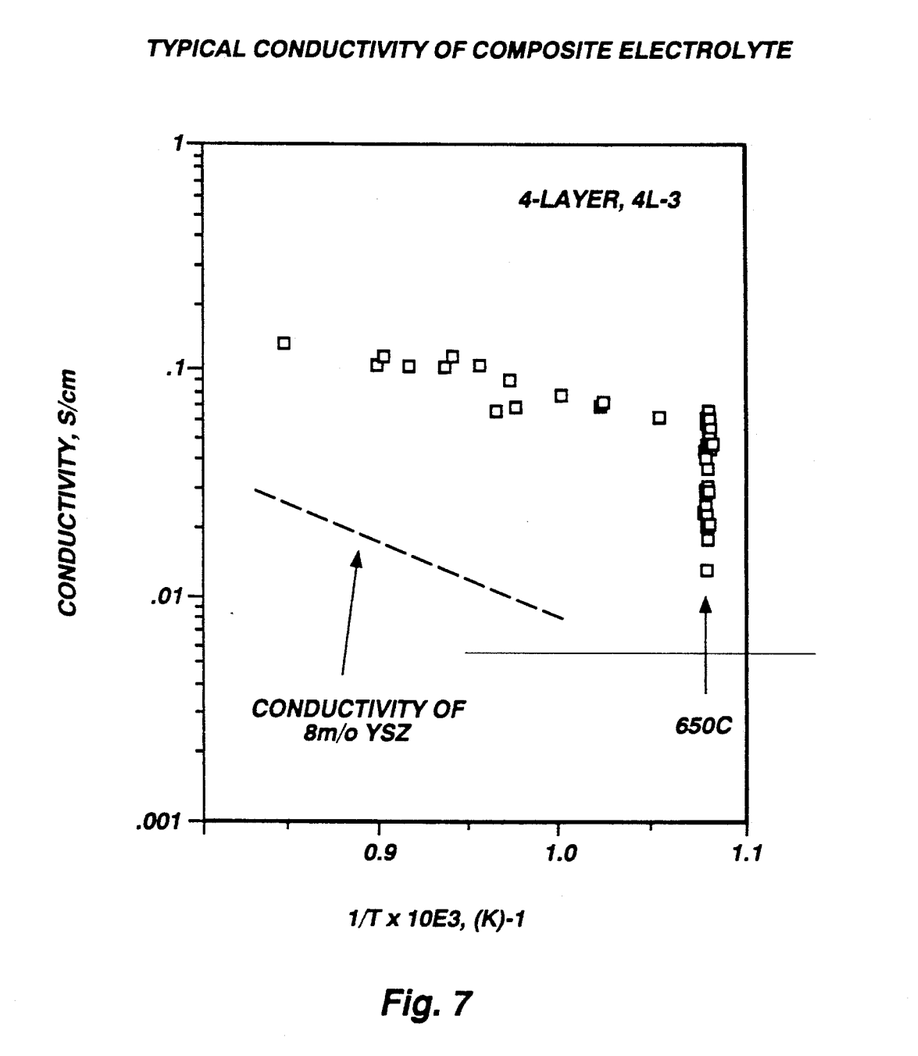
FIG. 7 is a graph illustrating the conductivity of a four-layer electrolyte composite of the instant invention.

FIG. 7 shows the typical conductivity plot of a composite electrolyte having the composition 4L-3. The conductivity degraded somewhat with decreasing temperature and was somewhat less than a pure solid solution. The conductivity was still greater than that of stabilized zirconia by a factor of five.

One of the unique aspects of composite electrolytes of this invention is that a solid state, planar fuel cell/electrolyzer may be constructed. For space applications, fuel cells are often linked with electrolyzers so that in one mode oxygen and hydrogen, or other hydrogen-containing gas such as methane, are reacted in the fuel cell to produce electricity and water vapor, while in an electrolyzer, water may be introduced as water vapor be to electrolyzed to regenerate fuel, that is, hydrogen and oxygen.

The composite electrolyte of the instant invention permits the construction of a single fuel cell/electrolyzer unit to perform both functions. The composite electrolyte permits operation at a lower temperature, for example, in the neighborhood of 700°-800° C., as opposed to about 1000° C. for a zirconia electrolyte-based fuel cell. The increased conductivity of the composite electrolyte permits operation at the lower temperatures which enables the use of metals and metal-containing materials such as perovskites and the like as electrodes, conductors and the like thereby simplifying construction of the cell. Examples of such electrode materials are doped $LaMnO_3$, $LaCoO_3$, Pt or Ag as the cathode, $NiZrO_2$, $CoZrO_2$, Pt or Ag as the anodes.

For example, in space applications, a fuel cell is operated to generate electricity. During times when electricity may be generated from solar panels and the like, an electrolyzer enables the operator to regenerate the fuel to later be used in the fuel cell. Thus, the electrolyzer and fuel cell are rarely operated concurrently and a combination of these units into a single unit does not detract from the operation of the space vehicle.

Because of the different temperatures of sintering and different coefficients of thermal expansion between pure bismuth oxide or a bismuth oxide/yttria solid solution and zirconia, many of the composite electrolytes prepared exhibit some delamination between layers or unacceptable porosity of the zirconia-rich outer layer or some dishing, that is, curvature of the electrolyte plate due to the difference in coefficient of thermal expansion which ultimately tends to shrink bismuth oxide-rich layers to a smaller planar dimension than the zirconia oxide-rich outer layer.

Some of these problems may be eliminated or at least diminished by first pressing a powder composition at a low pressure, for example, about 20 MPa, then introducing the second layer and similarly pressing that and so on until a three- to four-layer composite of powder has been formed, then subjecting the whole composite to pressure in the neighborhood of about 200 MPa. Such a composite planar material may then be hot pressed at about 1073K to about 1273K to form an article having minimum porosity, minimum delamination and maximum planarity. Forming composites with five to six layers may also tend to eliminate delamination problems and result in less warpage.

Another approach towards forming planar sintered composite electrolytes is to form both outer layers of thin zirconia-rich materials, gradually grading the composition towards a relatively thick center layer which is bismuth oxide rich. Fuel cells in which bismuth oxide is used as any part of the electrolyte must eliminate the possibility of fuel, for example, hydrogen, reaching the bismuth oxide and causing it to reduce, thereby greatly decreasing its oxygen ion-conducting property. Zirconia, however, may be exposed to either oxygen or fuel without any adverse consequence.

The thickness of the outer layers of a symmetrically graded electrolyte is from about 10 to about 20 $\mu m$. Interior layers may have a thickness from about 50 to about 75 $\mu m$ with the overall thickness of the electrolyte being from about 75 $\mu m$ to about 100 $\mu m$.

Another advantage of using such a symmetrical graded electrolyte, i.e. one in which both outer layers are zirconia, is that no care need to be taken as to which surface is in contact with the electrode or the cathode.

A graded electrolyte of such construction can be made from individual tape cast layers of different compositions or by placing zirconia powder in an isostatic press and then pressing to about 20 to 30 MPa. A powder composition containing 30 to 40% bismuth oxide and the remainder of zirconia can then be sequentially placed in the press and similarly pressed. The internal bismuth oxide-rich layer is preferably thicker than the combined zirconia layers. Another intermediate layer may be used in which the bismuth oxide predominates or a central layer in which bismuth oxide is present as 82% to 95% of the powder. The whole composition may then be uniaxially pressed to a very high pressure, for example, in the neighborhood of 200 MPa. Such a composition may then be hot pressed quickly at high temperatures, for example, temperatures in the range of 1300° C. since the bismuth oxide is fully contained, except for the edges, so that very little loss of bismuth oxide occurs. Also, if the hot pressing is done rapidly, substantially complete sintering of the zirconia layers may occur and because of the insulating characteristics of the ceramic, the bismuth oxide interlayer may not achieve the same temperature as the surface layers, that is, bismuth oxide may only reach a lower temperature which is quite satisfactory to sinter completely the bismuth oxide. Such a sintered composite electrolyte may then be cooled in a standard fashion without any significant delamination occurring, however, the composite electrolyte may be removed from the furnace and the sintered surface layers uniformly rapidly cooled to shrink the surface layers while the central regions are still relatively warm so that when the central regions cool and shrink, the relative shrinkage of the central region to the surface layers will, in fact, be less so that less delamination occurs. Also, by processing in this fashion, the article in actual use at a temperature of 700-800° C. should be at a relatively neutral stress condition. Any surface cooling must be carefully done to avoid uneven surface temperatures which would set up undesirable thermal stresses.

The process just described also includes substitution of a bismuth compound which converts to bismuth oxide upon sintering.

Composite electrolytes according to this invention have low resistance to oxygen transport and generally have conductivities which are a factor of five or more greater than zirconia and, when formed in a symmetrical pattern as described herein, the conductivities may be as high as even ten times that of zirconia. In symmetrical formation, the relative thickness of the zirconia may be very small in comparison to the bismuth oxide-rich central zone so that the bulk of the electrolyte is formed of a material having a high oxygen ion conductivity.

What is claimed is:

1. An oxygen conducting ceramic electrolyte having a graded composition comprising:
    a first outer surface layer comprising $Bi_2O_3$ as the predominant metal oxide, an effective amount of an electrolytic metal oxide dopant which increases the oxygen ion transport characteristics of said $Bi_2O_3$;
    a second outer surface comprising $ZrO_2$ as the predominant metal oxide, an effective electrolytic metal oxide dopant which increases the oxygen transport characteristics of $ZrO_2$; and
    at least one intermediate layer comprising $Bi_2O_3$ in a significant amount and an electrolytic dopant for $Bi_2O_3$, $ZrO_2$ in a significant amount and an effective electrolytic dopant for $ZrO_2$, said $Bi_2O_3$ being present in an amount substantially less than the amount of $Bi_2O_3$ present in said first outer surface layer and said $ZrO_2$ being present in an amount substantially less than the amount of $ZrO_2$ present in said second outer surface layer.

2. A solid state fuel cell/electrolyzer comprising:
    a composite sintered electrolyte having a first outer layer consisting essentially of $ZrO_2$ and $Y_2O_3$ or $CeO_2$ with a second outer layer consisting essentially of $Bi_2O_3$ and a suitable metal oxide dopant and with one or more inner layers having compositions intermediate said outer layers;
    a first porous electrode adherent to said first outer layer, said electrode being suitable for contact with a gaseous fuel containing hydrogen;
    a second electrode which is porous or pervious to oxygen molecules, said second electrode adherent to said second outer layer;
    means to heat said electrolyte to a temperature of about 700°-800° C.;
    conductor means to conduct current to or from said electrodes;
    containment means for containing the respective gases in contact with their respective electrodes and insulated from one another;
    gaseous fuel introduction means for introducing fuel to said first electrode; and
    oxygen introduction means for introducing oxygen to said second electrode.

3. A sintered ceramic article of a graded composition comprising:
    a first outer layer consisting essentially of about 95% zirconia and about 5% of an oxide mixture of $Bi_2O_3$, and $Y_2O_3$ wherein the molar ratio of $Bi_2O_3$ to $Y_2O_3$ is from about 3:1 to about 3:2 and wherein said zirconia is substantially present as cubic zirconia;
    a second outer layer consisting essentially of an oxide mixture of $Bi_2O_3$ and $Y_2O_3$ wherein the molar ratio of $Bi_2O_3$ to $Y_2O_3$ is from about 3:1 to about 3:2; and
    at least two intermediate layers wherein a first intermediate layer adjacent said first outer layer consists essentially of about 65-80% $ZrO_2$ and about 20-35% of an oxide mixture of $Bi_2O_3$ and $Y_2O_3$ wherein the molar ratio of $Bi_2O_3$ to $Y_2O_3$ is from about 3:1 to about 3:2 and a second intermediate layer adjacent said second outer layer and in contact with said first intermediate layer, said second intermediate layer consisting essentially of about 15-25% $ZrO_2$ and about 75-85% of an oxide mixture of $Bi_2O_3$ and $Y_2O_3$ wherein the molar ratio is from about 3:1 to about 3:2, said layers forming an integral unit.

4. A process for forming a sintered ceramic article of a graded composition comprising:
    forming a first outer layer consisting essentially of about 95% zirconia powders and about 5% of a powder mixture of $Y_2O_3$ and a sufficient amount of a bismuth compound which converts upon sintering to $Bi_2O_3$ to be present in a ratio of $Bi_2O_3$ to $Y_2O_3$ of from about 3:1 to 3:2;
    forming a first intermediate layer in intimate contact with said first outer layer; said first intermediate layer consisting essentially of about 75-95% of $ZrO_2$ powders and about 5-25% of a powder mixture of $Y_2O_3$ and a sufficient amount of a bismuth compound which converts upon sintering to $Bi_2O_3$ to be present in a ration of $Bi_2O_3$ to $Y_2O_3$ of about 3:1 to 3:2;

forming a second intermediate layer in intimate contact with said first intermediate layer consisting essentially of about 35-45% $ZrO_2$ and about 55-65% of a powder mixture of $Y_2O_3$ and a sufficient amount of bismuth compound which converts upon sintering to $Bi_2O_3$ to be present in a ratio of $Bi_2O_3$ to $Y_2O_3$ of about 3:1 to 3:2;

forming a second outer layer in intimate contact with said second intermediate layer consisting essentially of a powder mixture of $Bi_2O_3$ and $Y_2O_3$ wherein the molar ratio of $Bi_2O_3$ and $Y_2O_3$ is about 3:1 to 3:2 upon sintering of the ceramic article;

pressing said layers together to form a green ceramic article; and hot pressing said green ceramic article at a sufficient temperature and at a sufficient pressure to form a sintered article.

5. The electrolyte of claim 1, wherein said first outer layer comprises at least 95% by weight of a $Bi_2O_3$-metal oxide dopant composition.

6. The electrolyte of claim 2, wherein said metal oxide dopant is one selected from the group consisting of rare earth oxides such as yttria, ytterbia, and alkaline earth oxides.

7. The electrolyte of claim 1, wherein said second outer layer comprises at least 95% by weight of a $ZrO_2$-metal oxide dopant composition.

8. The electrolyte of claim 7, wherein said metal oxide dopant is one selected from the group consisting of yttria, ytterbia, calcia, magnesia, scandia alkaline earth, and rare earth oxides.

9. The electrolyte of claim 1, wherein two intermediate layers are present, a first intermediate layer comprising predominantly a $Bi_2O_3$-metal oxide dopant composition and a minor amount of a $ZrO_2$-metal oxide dopant composition adjacent said first outer layer, a second intermediate layer comprising predominantly a $ZrO_2$-metal oxide dopant composition and a minor amount of a $Bi_2O_3$-metal oxide dopant composition adjacent said second outer layer and said first intermediate layer.

10. The electrolyte of claim 9, wherein said first intermediate layer comprises at least about 85% by weight of a $Bi_2O_3 \cdot Y_2O_3$ composition, wherein said $Bi_2O_3 \cdot Y_2O_3$ molar ratio is from about 3:1 to about 3:2.

11. The electrolyte of claim 9, wherein said second intermediate layer comprises at least about 65% by weight of a $ZrO_2 \cdot Y_2O_3$ composition wherein said $Y_2O_3$ content is from about 3 to about 10 mol. % of said $ZrO_2 \cdot Y_2O_3$ composition.

12. The sintered ceramic article of claim 3, wherein said molar ratio of $Bi_2O_3$ to $Y_2O_3$ is about 3:2.

13. The sintered ceramic article of claim 3, wherein said first intermediate layer is about 80% $ZrO_2$.

14. The process of claim 4, wherein said hot pressing is conducted at a pressure of about 1 to about 10 ksi and a temperature of about 850° C. to about 1100° C. for a period of time sufficient to sinter said first outer layer to at least 95% of theoretical density.

15. An oxygen-conducting ceramic electrolyte in a sintered condition having a graded composition comprising:

a pair of thin outer layers consisting essentially of zirconia as the predominant metal oxide and an effective amount of an electrolytic dopant which increases the oxygen transport characteristics of said zirconia; and at least one central layer consisting essentially of $Bi_2O_3$ in a significant amount in conjunction with an effective electrolytic dopant for said $Bi_2O_3$ and a significant amount of $ZrO_2$ in conjunction with an effective electrolytic dopant for said $ZrO_2$.

16. The electrolyte of claim 15, wherein said outer layers are sintered to a density of at least about 95% of theoretical.

17. The electrolyte of claim 15, wherein said dopant for said $ZrO_2$ consists of $Y_2O_3$, $Yb_2O_3$, or $CaO$.

18. The electrolyte of claim 15, wherein said dopant for said $Bi_2O_3$ consists of $Y_2O_3$ or $Yb_2O_3$.

19. The electrolyte of claim 15, wherein said central layer is thicker than the combined thicknesses of said outer layers.

20. The electrolyte of claim 15, wherein said central layer is predominantly $Bi_2O_3$ with an intermediate layer of $Bi_2O_3/ZrO_3$ between the central layer and each of said outer layers, the composition of said intermediate layer being intermediate of the composition of said central layer and said outer layers.

* * * * *